United States Patent [19]

Feldhake

[11] 4,122,242

[45] Oct. 24, 1978

[54] PROCESS FOR SEALING ELECTROCHEMICAL CELLS

[75] Inventor: Ralph H. Feldhake, Verona, Wis.

[73] Assignee: ESB Incorporated, Philadelphia, Pa.

[21] Appl. No.: 794,895

[22] Filed: May 9, 1977

[51] Int. Cl.² .................. B29C 25/00; H01M 1/02
[52] U.S. Cl. ............................. 429/174; 264/101; 264/230; 264/268; 264/342 R; 264/343
[58] Field of Search ............ 264/342 R, 343, 230, 264/268, 272, 101; 429/174, 173, 167

[56] References Cited

U.S. PATENT DOCUMENTS

| | | | |
|---|---|---|---|
| 2,249,091 | 7/1941 | Robinson et al. | 264/343 |
| 2,876,272 | 3/1959 | Bence et al. | 429/173 |
| 3,069,489 | 12/1962 | Carmichael et al. | 429/174 |
| 3,377,414 | 4/1968 | Weyer | 264/342 R |
| 3,437,530 | 4/1969 | Anderson | 429/173 |
| 3,443,006 | 5/1969 | Simons et al. | 264/343 |
| 3,530,056 | 9/1970 | Haddad | 264/342 R |
| 3,663,678 | 5/1972 | Miller | 264/343 |
| 3,713,896 | 1/1973 | Feldhake | 429/174 |
| 3,922,178 | 11/1975 | Winger | 429/82 |

*Primary Examiner*—Jeffery R. Thurlow
*Attorney, Agent, or Firm*—Gilbert W. Rudman; Anthony J. Rossi; Gary V. Pack

[57] ABSTRACT

A process for improving leakage resistant in a galvanic cell is provided. This is done by making an improved grommet and metal cover. The process comprises swelling a grommet which has been placed tightly around the periphery of a metal cover until the grommet is loose upon the metal cover, forcing a sealant solution between the swollen grommet and metal cover and then shrinking the grommet to substantially its original size to trap the sealant compound between the grommet and metal cover.

12 Claims, No Drawings

PROCESS FOR SEALING ELECTROCHEMICAL CELLS

BACKGROUND OF THE INVENTION

1. Field of the Invention

This invention relates to a process for forming leakage resistant seals between metal parts of electrochemical cells exposed to strong alkaline solutions. More particularly, it relates to a method for sealing the interface between the metal container and the metal cover of electrochemical cells containing alkaline electrolyte.

2. Description of the Prior Art

It has been found very difficult to form an electrically insulated liquid type seal between the metallic container and the metal cover of electrically chemical cells of the types using an alkaline electrolyte. Typical cell systems where this problem is encountered include mercury-cadmium cells, nickel-cadmium cells, nickel-zinc cells, silver oxide-zinc cells, silver oxide-cadmium cells, mercuric oxide-zinc cells and alkaline manganese dioxide-zinc cells. Although the problem is essentially in sealed rechargeable cells, it is also of major importance in the design of primary type batteries. This is particularly true of high quality batteries where the supplier endeavors to provide a high capacity battery capable of delivering its full output after extended storage.

In a typical cell, the active cell parts are assembled in a seamless metal cup. A metal cover forms the cell closure and the cup and cover form the two terminals of the cell. It is necessary to provide an insulating seal between the two metal parts and for this purpose a ring or grommet of non-conductive material has been used. This grommet may be shaped to slip over or be injected molded over the edge of the metal cover and is clamped to the metal cup by flanging the edge of the cup over the grommet. The material from which the grommet is made must be inert to the electrolyte contained in the cell and to the cell environment. It must be resilient and flexible and it must be resistant to cold flow under the pressure of the seal even under long periods of time. Materials such as nylon and polypropylene have been found to be suitable materials for this insulating gasket.

Unfortunately, it transpires that electrolyte, particularly alkaline electrolyte, has a strong tendency to creep on the metallic surfaces. This tendency is accentuated when an electrical potential is present. In actual experience it will be found that creepage is accentuated on a metal part which is in contact with and electrically negative to an alkaline electrolyte. The creepage is harmful in a number of ways. It represents a loss of electrolyte from a cell which at best has a very limited electrolyte supply. The electrolyte that leaks out can be harmful as it is a strong chemical. Also, in the case of alkaline electrolytes there is a reaction with air to form a white deposit. This deposit detracts from the appearance of the cell and can produce customer resistance.

Numerous designs of seals have been proposed for overcoming the leakage problem. These range from improved mechanical clamping of the grommet to seals based upon ceramic or metal fusion. One solution has been to coat the metal parts or grommet with an asphaltic compound. Unfortunately, asphaltic compounds slowly flow under the pressure exerted by the gases contained in the cell which results in eventual leakage. Also, the sticky asphaltic surface is difficult to handle during manufacturing processes. In particular, it tends to pick up dirt and lint from the air and these impurities can interfere with proper sealing.

Common adhesives have been unsatisfactory. For example, epoxy resins applied to metal, while making a perfect and permanent seal with nonpolar liquids, are found with alkaline electrolytes to be lifted off of the metallic surface by the greater surface forces of the electrolytes. Also, usual epoxies tend to be brittle. The stresses imposed on epoxy seals during the operation of closing the cell seem to create cracks or other capillary leakage paths so that the seal made with the normal epoxies have not been as reliable as seals made with asphaltic seal coatings.

U.S. Pat. No. 3,922,178 issued Nov. 25, 1975 to Carol Winger and U.S. Pat. No. 3,712,896 issued Jan. 30, 1973 to Ralph Feldhake disclose the application of a fatty polyamide and a fatty polyamide epoxy mixture to either the grommet or to the metal cover prior to injection molding the nylon grommet to the metal cover. These compounds provide an adequate seal but require extensive equipment and processing for successful application and use. What is required, is a method not requiring extensive equipment and having ease of processing which will provide an insulating seal.

SUMMARY OF THE INVENTION

The present invention provides a process for preventing the alkaline electrolyte and the alkaline cell from wetting a surface where such wetting is not desired. As a result, the invention provides a process for manufacturing an improved grommet and metal cover which when used in a galvanic cell improves the leak resistance. It also provides a process for protecting certain surfaces and a galvanic cell from being wet by an attack from electrolyte.

Broadly, the invention provides a process for incorporating a sealant compound between a metal cover and grommet. The process is comprised of (1) swelling a grommet which has been placed tightly around the periphery of a metal cover until the grommet is loose upon the metal cover, (2) forcing a sealant solution between the swollen grommet and metal cover and then (3) shrinking the grommet to substantially its original size to trap the sealant compound. The sealant trapped between the grommet and metal cover cannot be removed by any normal procedure and thus acts as an effective leakage inhibitor.

DESCRIPTION OF THE INVENTION

Conventional alkaline cells utilize a metal cover and a grommet to help seal against electrolyte leakage. The currently commercially available batteries are either of the "single top" or the "double top" variety. In both of these constructions, the metal cover also acts as the negative terminal for the battery.

In the "double top", there are two metal covers and negative terminals members, one above and in electrical contact with the other. The grommet surrounds the rim of both covers and extends well into the space of the two covers. Because of this latter feature, the leakage path is considerably longer than it would be with only a "single top". Usually, the grommet is injection molded around the periphery of the metal cover; however, the grommet can also be of the "snap on" variety. This "double top" construction has been further improved by a careful selection of the metals used for the cover members. In particular, it has been desirable to plate the inside of the inner cover with an easily amalgamateable metal and nickel plate all the other surfaces.

In the "single top" construction, a single sheet of metal has the grommet around its periphery. Many of the "single tops" are laminated or coated with a layer of another metal. This is to improve the cover's properties. The grommets of the "single top" are usually of the "snap on" variety, but they can also be injection molded around the periphery of the metal cover.

The grommet is made from a material that is not corroded by alkaline electrolyte, has a high compression and shear strength, and is capable of withstanding large forces without distortion of shape caused by cold flow. Materials which show these properties include the polyolefins, such as certain high density polypropylene and polyethylene, as well as materials of the nylon compounds, the polyfluorethylene compounds, etc. The nylons include 6, 6 nylon; 6, 12 nylon; 6 nylon, and 11 nylon. A particularly preferred material is a hard nylon composition commercially available under the trademark Zytel ®, especially Zytel 101 which is a 6, 6 nylon.

In performing the injection molding operation, the metal cover is placed into a mold having a cavity the size and shape of the desired grommet. The grommet material is made liquid by heat and is forced at high temperature into the mold cavity and allowed to cool. The finished part is then removed from the mold. This method of molding plastic is old in the art and is the normal method for fabricating thermoplastic materials.

Once the grommet has been placed tightly around the periphery of the metal cover, the process of this invention can be utilized.

(1) SWELLING THE GROMMET

Any liquid which can be absorbed by the grommet material can be used for the swelling the grommet. However, care must be taken that the grommet is merely swollen and not dissolved or damaged by the liquid.

When the grommet is nylon, the following liquids are utilizable: water, methyl alcohol, ethyl alcohol, N-propyl alcohol, N-butyl alcohol, ethylene glycol, benzyl alcohol, phenylethyl alcohol, acetaldehyde, benzaldehyde, methylene chloride, chloroform, trichloroethylene, xylene or mixtures thereof. Most effective are benzyl alcohol, chloroform, methyl alcohol and methylene chloride. All of these liquids have an absorption level of nine percent or above by the nylon.

The time required for the swelling of the grommet varies with the liquid used and the temperature applied. For a given liquid, the lower the temperature, the longer the time required for the swelling. For example, when distilled water is used the grommets are placed in boiling water for about 2 hours to obtain the desired amount of swelling. The temperature utilized in the process can range from room temperature to the temperature at which there is degradation of the grommet material. For example, 6, 6 nylon degradates at approximately 250° C., therefore, that is the maximum temperature which should be utilized. When methylene chloride is used as the liquid the preferred range is 39° C., the boiling temperature of methylene chloride, to about 150° C.; the most preferred range is about 90° to 110° C. Using methylene chloride at a temperature of 39° C., it will take about 6 hours for the swelling to occur. At the preferred temperature range of 90° to 110° C., the time required will be about 0.5 to 3 hours. Methylene chloride is the preferred liquid for safety reasons.

In one embodiment using methylene chloride, the methylene chloride is placed with the grommets and covers into a closed vessel. When the temperature surpasses the boiling point of the methylene chloride, the pressure inside the vessel increases, therefore at 39° C. the pressure is atmospheric pressure but at 150° C. the pressure will be approximately 100 pounds per square inch. At the preferred temperature of 90° to 110° C., the pressure will be about 65 to 75 pounds per square inch.

(2) FORCING A SEALANT SOLUTION BETWEEN THE GROMMET AND THE METAL COVER

The sealant solution consists of a sealant material and a solvent for the material. Suitable sealants include rosin, polystyrene, polyolefins, polypropylene, polyethylene, ethylene vinyl acetate, polyamine, polyisobutylene and other thermoplastic elastomers. Preferred are bitumen, polyamine and polyolefins, the most preferred is bitumen.

Bitumen is a generic term for mixtures of natural and pyrogenous hydrocarbons and other non-metallic derivatives which are soluble in carbon bisulfide. One that is particularly useful has a softening point measured by ASTM P36-26 of 180° to 185° F., a penetration measured by ASTM D5-52 at 77° F. of 15 to 20, a specific gravity at 60° F. of 1.00 + and a viscosity at 350° F. of 65 seconds, at 375° F. of 39 seconds and at 400° F. of 29 seconds. The solvents useful for the preferred bitumen include many of those liquids which swell the preferred nylon grommet. Particularly preferrable are methylene chloride, water, xylene, trichloroethylene and polychloroethylene. The most preferred is methylene chloride because of safety reasons.

The weight percentage of bitumen to solvent may range from 0.5 to 90% by weight. Preferrably the range is 20 to 60% by weight, and most preferrably is 35 to 45% by weight.

Several methods can be used for forcing the sealant solution between the swelled grommet and the metal cover. One method is vacuum impregnation. In this method, the swollen grommet is placed into a vacuum system, the sealant solution is added and the vacuum is released. The atmospheric pressure forces the sealant solution between the swelled grommet and the metal cover. Another method is to place the swollen grommets into the sealant solution to a sufficient depth to cover the grommets in a pressure vessel. The pressure vessel is then sealed and its temperature elevated. This temperature and pressure is maintained for a sufficient time to impregnate the grommets. When the liquid for swelling the grommets and the solvent for the sealant are the same, it is possible and preferred for both the swelling of the grommets and the forcing of the sealant solution to occur during one step of the process.

(3) SHRINKING THE GROMMET TO TRAP THE SEALANT

In this step, the grommet is processed to return it to substantially its original size, thereby trapping the sealant between the metal cover and the grommet. The solvent of the solution must be removed under conditions which will not degrade the grommet material and will also allow the bitumen to remain. For example, when 6, 6 nylon is used as the grommet, it should be dried at below 60° C. when exposed to oxygen because temperatures above that may degrade the nylon. However when oxygen is not present, for example, in an inert atmosphere or a vacuum, the oven temperature may be higher, up to 120° C., preferably about 100° C. It is preferable to vacuum dry the grommets in an vacuum oven for approximately 24 to 48 hours.

It should be understood that the higher the temperature the less the time required, and the lower the temperature the higher the time required.

After the process is concluded the grommets are washed to remove the excess sealant from the outside of the grommets. Preferably methylene chloride is used. The temperature of the methylene chloride used for washing should be from room temperature to about −40° C., the preferred range −20° to −40° C.

The benefits of this process include (1) having sealant placed between the metal cover and the grommet, (2) relieving molding stresses within the grommet, (3) increasing thermal stability by increasing the crystallinity of the grommet, (4) changing the surface tension characteristics of the grommet. All of these benefits contribute to production of an electrochemical cell which is more leakage resistant than conventional cells.

EXAMPLE 1

Metal covers of the "double top" variety and having an injection molded 6, 6 nylon grommet were placed into a flask equipped with a reflux condenser. Distilled water was added to the flask. This mixture was boiled for 2 hours to swell the grommets. The tops and grommets were removed, drained and placed into a second flask containing a 30% by weight bitumen in perchloroethylene solution. The contents of the flask were refluxed for 30 minutes, forcing the bitumen solution between the swelled grommets and the cover. The bitumen solution was drained. The grommets and covers were dried in a vacuum oven at 60° C. for 48 hours to cause the grommets to shrink to substantially their original size. The covers and grommets were cleaned by tumbling with wood clips wet with perchloroethylene until the exterior surfaces were free of bitumen. The tops and grommets were dried of perchloroethylene and assembled into alkaline cells of a RW 44 size (RW 44 is a standard size button cell made by Ray-O-Vac Division of ESB Incorporated).

EXAMPLE 2

Metal covers of the "double top" variety having an injection molded grommet of 6, 6 nylon were placed into a flask fitted with a reflux condenser containing methanol and refluxed for two hours, after which the grommets were swollen and loose on the metal tops. The covers and grommets were removed and placed into a second flask containing a 20% bitumen in xylene solution and refluxed for 30 minutes. This forced the bitumen solution between the grommets and covers. The bitumen solution was drained. The grommets and covers were dried in a vacuum oven at 60° C. for 48 hours to cause the grommets to return to substantially their original size. The covers and grommets were cleaned by tumbling with wood chips wet with xylene. The tops and grommets were dried of zylene and then assembled into alkaline cells of the same size as in Example 1.

EXAMPLE 3

Metal covers of the "double top" variety and having a 6, 6 nylon grommet was transferred to a pressure vessel and placed into a 40% by weight bitumen dissolved in methylene chloride solution. This solution had been prepared as follows:

a. weigh out 12.57 kilograms of bitumen (Pioneer E C 75427 NoFlow 113 sold by the Pioneer Corp.)
b. add 14.29 liters of methylene chloride,
c. agitate the solution until all the bitumen has dissolved,
d. calculate the density of solution, it should be 1.14 to 1.17 grams per cc. The pressure vessel was sealed and heat was applied until the temperature reached 100° C. The pressure inside the vessel was approximately 64 pounds per square inch at this point. This temperature and pressure was continued for 2 hours to swell the grommet and to force the sealant solution between the metal cover and the grommet. After 2 hours the heat was turned off. The vessel was allowed to cool to room temperature while the pressure was reduced to atmospheric pressure. The cover and grommets were removed from the pressure vessel. The excess bitumen was removed by placing the covers and grommets into a cleaning vessel. Cold methylene chloride solution was used to wash the covers and grommets by immersing the covers and grommets into the methylene chloride. The temperature of the methylene chloride was −20° C. to −40° C. The cleaning vessel cover was placed upon it and the covers and grommets were tumbled for one minute at 20 revolutions per minute. The methylene chloride was drained. The above washing procedure was repeated twice. The covers and grommets were dried by placing them into a vacuum oven. The vacuum oven had a 28 inch vacuum and a temperature of 70° C. The covers were dried for 12 to 24 hours in the oven and then removed ready for use. The covers and grommets which were treated by this process were used to make RW 44 size alkaline cells.

EXAMPLE 4

Cells of various sizes were made by the process in Example 3. These cells had zinc anodes, separators comprising an absorbent (Webril) and a barrier material of polyethylene grafted with methacrylic acid between layers of cellophane. The depolarizer mix comprised 50% by weight AgO, 1.5% by weight polytetrafluoroethylene, lubricant and binder, and the balance Ag$_2$O. These cells were tested for leakage under accelerated test conditions and compared to cells not having undergone the process. The results of these tests are on the following table. The treated cells showed marked improvement over the controlled cells.

Percentage Leakage At Anode As Determined by 10X Magnification Visual Test of Cells Having Grommets And Cover Treated By Process Of This Invention versus Cells Not Treated By Process versus Commercially Available Cells

| Size | 130° F/50% Relative Humidity | | Room Temperature |
|---|---|---|---|
| | 4 wks | 8 wks | 3 months |
| RW47 | | | |
| Untreated | 100% | 100% | 0% |
| Treated | 1.8% | 39.2% | 0% |
| Commercial Cell | 19.5% | 36.5% | 21% |
| RW48 | | | |

-continued

Percentage Leakage At Anode As
Determined by 10X Magnification Visual Test
of
Cells Having Grommets And Cover
Treated By Process Of This Invention
versus
Cells Not Treated By Process
versus
Commercially Available Cells

| Size | 130° F/50% Relative Humidity | | Room Temperature |
|---|---|---|---|
| | 4 wks | 8 wks | 3 months |
| Untreated | 100% | 100% | 1% |
| Treated | 0.5% | 34.3% | 9.5% |
| Commercial Cell | 12.% | 2.0% | 4.0% |
| RW44 | | | |
| Untreated | 99.5% | 100% | 0.5% |
| Treated | 10.% | 5.0% | 2.0% |
| Commercial Cell | 15.5% | 28.5% | 48.5% |
| RW49 | | | |
| Untreated | 90% | 98% | 0% |
| Treated | 15% | 58% | 2.5% |

I claim:

1. A process for manufacturing an improved grommet and metal cover for use in a galvanic cell; the process comprising:
   (A) swelling the grommet, which has been injected molded around the periphery of the metal cover, until the grommet is loose upon the metal cover, wherein a liquid is used to swell the grommet;
   (B) forcing a bitumen solution between the swollen grommet and metal cover, the bitumen solution being comprised of bitumen and solvent; wherein the liquid and the solvent are the same and the swelling of the grommet and forcing of the bitumen solution are done simultaneously; and
   (C) shrinking the grommet by drying to substantially its original size to trap bitumen between the grommet and metal cover.

2. The process of claim 1 wherein the grommet is made from a material which is a polyolefin.

3. The process of claim 1 wherein the grommet is a material selected from the group consisting of 6, 6 nylon; 6, 12 nylon; 6 nylon; and 11 nylon.

4. The process of claim 1 wherein the grommet is swollen by a liquid which has an absorption level of 9 or more by the grommet material.

5. The process of claim 4 wherein the liquid is methylene chloride.

6. The process of claim 1 wherein the swelling is by placing the grommet and cover into methylene chloride and subjecting the grommet and cover to a temperature of 39°–250° C. for time sufficient to swell the grommet.

7. The process of claim 6 wherein the time is 0.5 to 3 hours and the temperature is 90°–110° C.

8. The process of claim 1 wherein the bitumen has
   (a) a softening point, measured by ASTM P36-26 of 180° to 185° F.,
   (b) a penetration measured by ASTM D5-52 at 77° F. of 15 to 20,
   (c) a specific gravity at 60° F. of 1.00 +, and
   (d) a viscosity, at 350° F. of 65 seconds, at 375° F. of 39 seconds, and at 400° F. of 29 seconds.

9. The process of claim 8 wherein the sealant solution comprises, by weight, 0.5 to 90% bitumen.

10. The process of claim 9 wherein the sealant solution is 35 to 45% by weight bitumen, and the solvent is methylene chloride.

11. A process for manufacturing an improved grommet and metal cover for use in a galvanic cell; the process comprising:
    (A) swelling a 6, 6 nylon grommet, which as been injection molded around the periphery of a double top metal cover, until the grommet is loose upon the metal cover, wherein a liquid is used to swell the grommet;
    (B) forcing a bitumen solution, comprised of bitumen and solvent, between the swollen grommet and metal cover; wherein the liquid and solvent is methylene chloride. and the swelling and forcing are done simultaneously; and
    (C) shrinking the grommet in a vacuum oven to substantially its original size to trap bitumen between the grommet and metal cover.

12. An alkaline galvanic cell having a grommet and cover which has been subjected to the process of claim 11.

* * * * *